April 14, 1931.  F. H. McCORMICK  1,801,099

ELECTRIC HEATER

Filed May 8, 1928

Inventor:
Francis H. McCormick,
by Charles E. Tullar
His Attorney.

Patented Apr. 14, 1931

1,801,099

UNITED STATES PATENT OFFICE

FRANCIS H. McCORMICK, OF GLEN ELLYN, ILLINOIS, ASSIGNOR TO EDISON ELECTRIC APPLIANCE COMPANY, OF CHICAGO, ILLINOIS, A CORPORATION OF NEW YORK

ELECTRIC HEATER

Application filed May 8, 1928. Serial No. 276,159.

My invention relates to electric heaters, more particularly to electric heaters of the convection type, and has for its object the provision of a simple and reliable heater of this character.

My invention is particularly adapted to built-in heaters arranged to be mounted in an opening or recess provided for it in a wall, and has for a further object the provision of a heater of this character having a very neat and clean-cut appearance.

In carrying out my invention in one form I provide a heating unit comprising a plurality of helical heating elements, the heating elements being assembled in such relation with each other that the heating unit simulates a continuous helix. The air to be heated is passed both over the heating unit and through a channel adjacent the heating unit, the two streams of air being mixed as they emerge from the heater.

Figure 1:
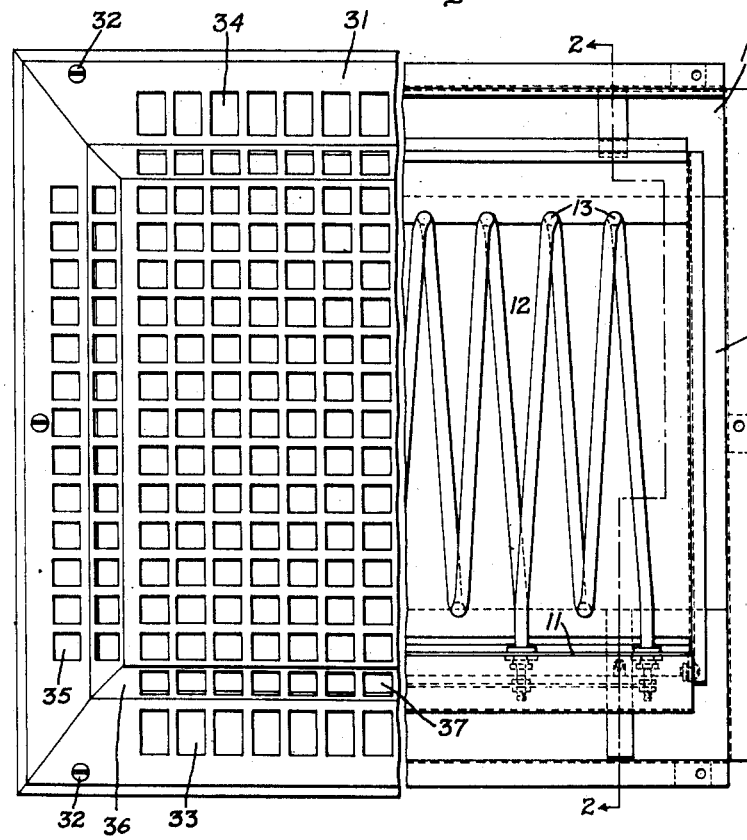
Figure 2:
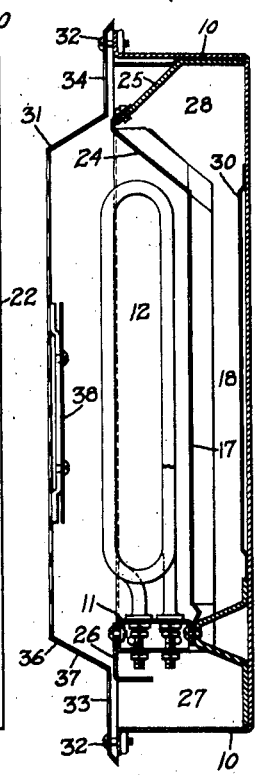
Figure 3:
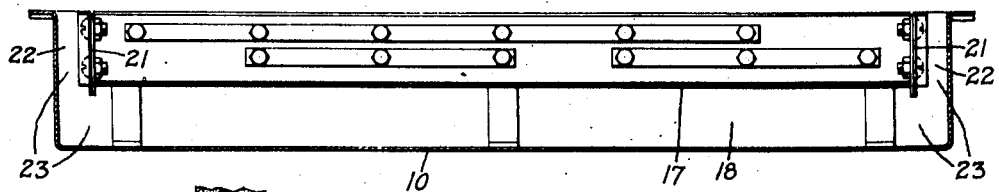
Figure 4:
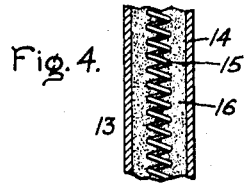

For a more complete understanding of my invention, reference should be had to the accompanying drawing in which Figure 1 is a fragmentary elevation of an electric heater embodying my invention; Figure 2 is a vertical sectional view of the electric heater taken through the line 2—2 of Figure 1; Figure 3 is a horizontal sectional view of the electric heater; and Figure 4 is an enlarged section of a portion of one of the heating elements.

Referring to the drawing, I have shown my invention in one form as applied to a wall type convection heater, that is, a heater that is arranged to be mounted in an opening or recess provided for it in the wall of a building. As shown the heater comprises an open front metallic casing 10, the casing 10 being adapted to be set in an opening in a wall. A metallic supporting bracket 11 is supported from the rear wall of casing 10 and in spaced relation thereto. A heating unit 12 comprising a plurality of helical coil sheathed wire elements 13 of construction such as described and claimed in the Abbott Patent No. 1,367,341, is mounted upon the supporting bracket 11. Each heating element 13 comprises an outer metallic sheath 14 suitably shaped, in which a helical heating resistor 15 is embedded in powdered heat refractory insulating material 16. As shown, the ends of each heating element 13 are flanged, the flanges resting securely upon the metallic plate 11. The heating elements 13 are connected in series-parallel relation and, as shown in Figure 1, are arranged about a common axis so that they simulate a continuous helical heating unit. Preferably and as shown, the common axis of the heating elements will be substantially horizontal and will be positioned lengthwise in the heater. Thus, the heating unit 12 is so formed longitudinally as to give the effect of a continuous helix, and is so formed laterally as to give the effect of a flattened helix, this construction not only presents a very neat appearance but provides a most efficient heating unit since the air may flow very freely past the unit and in close proximity to the helical coil sheathed wires. It will be observed that the convolutions of the heating elements are relatively long so as to extend throughout substantially the entire height of the front opening, and while flattened, are sufficiently wide to project from the front opening of the casing. This arrangement of the heating elements provides a considerable heating area.

An internal plate 17 is placed between heating unit 12 and the rear wall of casing 10, the plate 17 being supported from the rear wall and in spaced relation thereto, thereby forming a vertical passageway 18 within the casing 10. A pair of vertical plates 21 are supported by the plate 11 in spaced relation with the side walls of casing 10, thereby forming vertical passageways 22 within the casing 10, the vertical passageways 22 merging with the passageway 18 to form a vertical flue 23. Plate 17, whose upper portion 24 is inclined upwardly to a point substantially flush with the front opening of the casing 10, together with supporting member 11 and side plates 21 form a chamber for heating unit 12. The plate 17 is secured against lateral displacement by bracing members 25. A terminal shield 26 is supported by plate 11.

In considering thus far the construction of the heater, it will be seen that a chamber has been provided for housing the heating unit, the chamber being enclosed by a casing in spaced relation thereto, whereby a flue or passageway surrounds the chamber on three sides. Below the plate 11 and leading to the flue 23 is a chamber 27 through which air may pass from the interior of casing 10 and through the flue. Above the inclined portion 24 of plate 17 and leading from the flue is a chamber 28 through which air may pass from the flue 23 to the exterior of the casing. Thus, air not only may pass over the heating unit itself and thereby be heated, but also up through the flue 23, the air within the flue 23 being heated by radiation from the heating unit 12. The inner surface of the back wall of the casing 10 is provided with a steel plate 30 spaced therefrom so that a small air space is enclosed by the back wall and the steel plate. This construction serves to reduce radiation to the wall box to a minimum.

A guard plate or grille 31 is placed across the front opening of casing 10 and is secured to the casing 10 by means of bolts 32. The guard plate or grille 31 is provided with openings 33 in its bottom portion, whereby air may enter the chamber 27, and is provided with like openings 34 at the top whereby air may pass from the chamber 28. The plate or grille 31 is also provided with openings 35 leading to the vertical passageways 22. Referring to Figure 2, it will be seen that the guard plate or grille 31 is extended forwardly at its central portion from the casing 10. The walls 36 of the plate or grille 31 joining its two vertical portions are provided with openings 37. This construction of the plate or grille 31 not only provides more depth for the heating unit than is ordinarily provided, but also eliminates possible danger of having the air circulation shut off.

A plate 38 is placed in front of the heating unit 12, slightly behind the plate or grille 31, the plate 38 serving to shut off a large proportion of direct radiation of heat without affecting the free circulation of air through the heater, since the air may freely enter at the bottom and flow outward at the top.

In operation of the electric heater, air flows in at the lower portion of the heater, a portion of the incoming air flowing upward around the heating unit 12 and a portion flowing upward through the flue 23. The hot air passing from the unit 12 flows through the openings in the upper portion of the guard plate or grille 31 and mixes with the cooler air flowing through the openings 34 from the chamber 28. Thus, the comparatively cool air emerging from the chamber 28 mixes with the hot air from the unit 12, the resultant temperature of the outgoing air being substantially reduced. In this manner a very large amount of air is heated to a low temperature.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. An electric heater comprising a casing provided with a central opening and with a flue communicating with the exterior of the casing at its lower and upper portions so that air is free to flow through said flue, a forwardly projecting grille around said opening, and a heating unit mounted in said casing adjacent said flue, and projecting into said grille so that air can freely circulate over said heating unit.

2. An electric heater comprising a casing provided with a central opening and with a flue communicating with the exterior of the casing at its lower and upper portions so that air is free to flow through said flue, a forwardly projecting grille around said opening, a heating unit mounted in said casing adjacent said flue and projecting into said grille, and a baffle plate between said heating unit and said grille.

3. An electric heater comprising a casing having a front opening therein, a support within said casing and a flattened helical heating unit mounted on said support with its axis substantially horizontal, said heating unit extending substantially throughout the length of said front opening, and its convolutions having a length substantially equal to the height of said front opening.

4. An electric heater comprising a plurality of sinuous sheaths arranged about a common axis so as to simulate a continuous helix, powdered heat refractory insulating material in said sheaths, a sinuous resistance heating element within each of said sheaths embedded in said insulating material, a support, and connections between the ends of said sheaths and said support, the convolutions of said sheaths being self-supporting between said ends and supported by said ends in spaced relation with said support so that air has free and unobstructed circulation around said convolutions.

5. An electric convection heater comprising a sinuous sheathed heating unit, a support, and connections between the ends of said unit and said support, the convolutions of said unit being self-supporting between said ends and supported by said ends in spaced relation with said support so that air has free and unobstructed circulation around said convolutions.

6. An electric air heater comprising a casing, a sinuous sheath, powdered heat refractory insulating material in said sheath, a resistance heating element within said sheath embedded in said insulating material, a support, and connections between the ends of said sheath and said support, the convolutions of said sheath being self-supporting between said ends and supported by said ends in spaced relation with said support so that air has free and unobstructed circulation around said convolutions.

7. An electric heater comprising a plurality of flattened helical heating elements, and a support to which the ends of said heating elements are secured whereby the heating elements are supported thereon to have a common axis, the convolutions of said heating elements being self-supporting between said ends so as to provide for free and unobstructed circulation of air around said convolutions.

8. An electric air heater comprising a casing, a chamber within said casing, a plurality of flattened helical metallic sheaths mounted within said chamber about a substantially horizontal common axis so as to simulate a continuous horizontally arranged helix extending substantially throughout the length of said chamber, the convolutions of said helix having a length substantially equal to the height of said chamber, a sinuous heat resistance element within each of said sheaths, and powdered heat refractory insulating material filling said sheaths and compacted around said heat resistance elements.

9. A convection electric heater comprising a casing provided with an opening in its front side and with a flue communicating with the exterior of the casing at its lower and upper portions whereby air is free to flow through said flue, a forwardly projecting grille around said opening, a heating unit mounted within said casing adjacent said flue and so as to project into said grille, and means including a baffle member positioned in front of said heating unit for forming a flue for the passage of air around said heating unit.

10. A convection electric heater comprising a casing provided with an opening in its front side and a flue adjacent the rear wall thereof and communicating with the front side thereof at its lower and upper portions whereby air may flow upwardly through said flue, and a heating unit mounted within said casing and embraced by said flue, said heating unit projecting from said front opening whereby air may freely circulate over said heating unit, the air passing from said heating unit mixing with the air emerging from said flue.

11. An electric heater comprising a casing having a central opening, a forwardly projecting grille around said opening, and a heating unit comprising a plurality of flattened helical heating elements arranged about a common axis so as to simulate a single continuous helical heating unit mounted within said casing and projecting into said grille.

12. An electric heater comprising a casing open at its front side, a forwardly projecting grille around said opening, a chamber arranged within said casing and spaced from the walls thereof to form an air passage between the walls of said casing and said chamber, a heating unit simulating a continuous helix mounted within said chamber and projecting into said grille, and a baffle plate extending across the open side of said casing.

13. An electric heater comprising a casing open at its front side, a forwardly projecting grille around said opening, a chamber arranged within said casing and spaced from the walls thereof to form an air passage between the walls of said casing and said chamber, a plurality of metallic sheaths simulating a continuous helix mounted within said chamber and projecting into said grille, powdered heat refractory insulating material in said sheaths, a sinuous resistance heating element within each of said sheaths embedded in said insulating material, and a baffle plate extending across the open side of said casing.

14. An electric heater comprising a casing open at its front side and provided with a forwardly projecting grille around said opening, a chamber arranged within said casing and spaced from the walls thereof to form an air space in the bottom of said casing leading from the exterior of the casing, an air space in the top of said casing leading to the exterior of the casing and a vertical air space connecting said chambers whereby air may enter the lower portion of said casing and emerge from the upper portion thereof, and a helical heating unit mounted within said chamber and projecting into said grille whereby air may freely circulate over said heating unit, the air passing from said unit mixing with the air emerging from the chamber within the upper portion of the casing.

In witness whereof I have hereunto set my hand this 30th day of April, 1928.

FRANCIS H. McCORMICK.